(12) United States Patent
Yu

(10) Patent No.: US 9,552,479 B2
(45) Date of Patent: *Jan. 24, 2017

(54) MALWARE DETECTION AND COMPUTER MONITORING METHODS

(71) Applicant: Bank of America Corporation, Charlotte, NC (US)

(72) Inventor: Sounil Yu, Reston, VA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,951

(22) Filed: May 11, 2015

(65) Prior Publication Data

US 2015/0248555 A1    Sep. 3, 2015

Related U.S. Application Data

(63) Continuation of application No. 13/966,842, filed on Aug. 14, 2013, now Pat. No. 9,058,488.

(51) Int. Cl.
*G06F 21/00* (2013.01)
*G06F 21/56* (2013.01)

(52) U.S. Cl.
CPC ............. *G06F 21/56* (2013.01); *G06F 21/561* (2013.01); *G06F 21/564* (2013.01); *G06F 2221/033* (2013.01)

(58) Field of Classification Search
CPC ...... G06F 21/56; G06F 21/561; G06F 21/564; G06F 2221/033
See application file for complete search history.

(56) References Cited

U.S. PATENT DOCUMENTS

| | | |
|---|---|---|
| 7,725,937 B1 | 5/2010 | Levy |
| 8,015,284 B1 * | 9/2011 | Isenberg ................. G06F 21/51 709/224 |
| 8,056,134 B1 * | 11/2011 | Ogilvie ................. G06F 21/566 713/187 |
| 8,365,283 B1 | 1/2013 | Satish et al. |
| 8,402,539 B1 | 3/2013 | Chen et al. |
| 8,458,797 B1 | 6/2013 | Yu et al. |
| 8,700,913 B1 | 4/2014 | Chang et al. |
| 8,776,227 B1 | 7/2014 | Glick et al. |
| 8,819,825 B2 * | 8/2014 | Keromytis ............ H04L 63/145 709/205 |

(Continued)

*Primary Examiner* — Michael Pyzocha
(74) *Attorney, Agent, or Firm* — Banner & Witcoff, Ltd.; Michael A. Springs

(57) ABSTRACT

A method is disclosed, where some embodiments of the method include installing at least one benign malware indicator on one or more computing devices, monitoring the one or more computing devices for the presence of the at least one benign malware indicator, and responsive to determining the benign malware indicator is no longer present, sending a notification indicating the benign malware indicator is no longer detected as present on the one or more computing devices. Other embodiments include performing an antivirus scan or identifying unauthorized software programs. An apparatus and one or more non-transitory computer-readable media storing computer-readable instructions capable of performing similar actions, the latter in conjunction with a computer executing instructions stored on the media, are also disclosed.

12 Claims, 4 Drawing Sheets

(56) References Cited

U.S. PATENT DOCUMENTS

| | | | |
|---|---|---|---|
| 8,875,255 B1* | 10/2014 | Dotan | G06F 21/31 713/182 |
| 2002/0066028 A1 | 5/2002 | Welborn et al. | |
| 2002/0147915 A1 | 10/2002 | Chefalas et al. | |
| 2007/0283438 A1 | 12/2007 | Fries et al. | |
| 2007/0289018 A1* | 12/2007 | Steeves | G06F 21/56 726/24 |
| 2008/0005797 A1 | 1/2008 | Field et al. | |
| 2009/0271842 A1 | 10/2009 | Baumhof | |
| 2010/0269175 A1* | 10/2010 | Stolfo | G06F 21/55 726/22 |
| 2011/0167494 A1* | 7/2011 | Bowen | G06F 21/566 726/24 |
| 2012/0079596 A1 | 3/2012 | Thomas et al. | |
| 2012/0304244 A1 | 11/2012 | Xie et al. | |
| 2013/0167236 A1 | 6/2013 | Sick | |
| 2013/0247182 A1* | 9/2013 | Levites | G06F 21/55 726/22 |
| 2013/0333033 A1 | 12/2013 | Khesin | |

* cited by examiner

MALWARE DETECTION AND COMPUTER MONITORING METHODS

This application is a continuation of U.S. patent application Ser. No. 13/966,842, entitled "Malware Detection and Computer Monitoring Methods" and filed on Aug. 14, 2013, the entire disclosure of which is hereby incorporated by reference.

BACKGROUND

Malicious software (e.g., "malware") presents a serious hazard to computer systems and devices. Once present on a computing system or device malware can, amongst other effects, appropriate personal, financial or otherwise sensitive information, and hinder or wholly prevent proper system performance. Despite efforts to block or remove malware from systems, such as the use of antivirus software programs, it is estimated that millions of computing systems are infected with some form of malware. The widespread presence of malware is due in part to the extent and diversity of malware variants. Indeed, malware can take the form of viruses, worms, bots, Trojan horses, rootkits, keyloggers, spyware, adware, and ransomware, amongst others, and new types of each are being made constantly.

Typical methods for protecting computing devices from malware utilize code signatures from known malware variants. For example, techniques such as deep packet inspection can be used to examine all data or files entering a network and compare it to known malware signatures. If some or all of the incoming code matches a known signature, the data or file is denied access. These methods, however, rely on discovering and identifying malware signatures. Because so many new malware variants are being constantly created the computing system is still vulnerable to these new variants whose signatures have not been identified. Malware capable of mutating its own code can also avoid detection by these techniques by changing its code from the identified signature.

Various heuristic analysis techniques can be used to attempt to detect the presence of currently unknown types of malware by evaluating the traits of individual files. For example, some heuristic techniques scan the code of files for flagged characteristics that are indicative of malware or execute the files in a protected environment, such as a sandbox, and analyze the attempted actions of the file. These heuristic techniques often result in false positives and the subsequent quarantine of benign files, however, and the intensive amount of analysis required can consume an undesirable amount of system resources.

Even combining these forms of analysis, the ever expanding scope of malware variants can provide malware that escapes these detection methods and may not be promptly recognized, if at all, as being present on a computing device or network. Therefore, it would be desirable to provide additional detection techniques that can promptly indicate the presence of malware, even if a currently unidentified variant of malware, without falsely identifying truly acceptable files or consuming an undesirable amount of system resources in the process.

Additionally, as part of a network security strategy, information technology ("IT") professionals and similar employees often ask users to only utilize previously approved software rather than installing additional programs that could potentially compromise the security of the user's computing device or the network as a whole. Despite this, users may still install additional programs on their own computing devices. As such actions can unwittingly comprise the security of their own computing device or network, it would also be desirable to provide techniques of indicating the presence of unauthorized software on a user's computing device.

SUMMARY

The following presents a simplified summary of the present disclosure in order to provide a basic understanding of some aspects of the present disclosure. This summary is not an extensive overview of the present disclosure. It is not intended to identify key or critical elements of the present disclosure or to delineate the scope of the present disclosure. The following summary merely presents some concepts of the present disclosure in a simplified form as a prelude to the more detailed description provided below.

In accordance with one aspect a method is disclosed, the method comprising installing at least one benign malware indicator on one or more computing devices, monitoring the one or more computing devices for the at least one benign malware indicator, and responsive to determining that the at least one benign malware indicator is no longer detected as present on at least one of the one or more computing devices, sending a notification indicating that the at least one benign malware indicator is no longer detected as present on the at least one of the one or more computing devices.

In certain exemplary embodiments, the method further comprises, responsive to detecting removal of the at least one benign malware indicator from the at least one of the one or more computing devices, performing an antivirus scan on the at least one of the one or more computing devices where the at least one benign malware indicator is no longer present, while in others it further comprises, responsive to detecting removal of the at least one benign malware indicator from the at least one of the one or more computing devices, updating an antivirus program before performing the antivirus scan on the at least one of the one or more computing devices, and wherein the antivirus scan is performed on the at least one of the one or more computing devices subsequent to the antivirus program being updated.

In various exemplary embodiments, the method further comprises, responsive to detecting removal of the at least one benign malware indicator from the at least one of the one or more computing devices, identifying a plurality of software programs installed on the one or more computing devices, comparing each of the plurality of software programs to a list of approved software programs to identify one or more unauthorized software programs installed on at least one of the one or more computing devices, and sending a notification indicating that the one or more unauthorized software programs are installed on the at least one of the one or more computing devices. In some of these embodiments, the identified, approved and unauthorized software programs comprise antivirus programs.

In some exemplary embodiments, the at least one benign malware indicator is an installed malware program, and the method further comprises configuring an antivirus program used to protect the one or more computing devices to prevent one or more undesired effects attributable to the installed malware. In various embodiments, the monitoring of the one or more computing devices for the at least on benign malware indicator comprises using at least one of a subject and observer pattern, one or more polling techniques, or one or more push techniques. In certain embodiments, the at least one benign malware indicator comprises at least one of a known malware signature, a hook, a kernel driver, a new or modified dynamic link library ("DLL") file, a modified registry key, a modified system file, a connection and socket, an application program interface ("API") function, or packed code.

In accordance with another aspect, an apparatus is disclosed, the apparatus comprising at least one processor and at least one non-transitory computer-readable medium having stored therein computer executable instructions, that when executed by the at least one processor, cause the apparatus to install at least one benign malware indicator on one or more computing devices, detect removal of the at least one benign malware indicator from at least one of the one or more computing devices, and responsive to detecting removal of the at least one benign malware indicator from at least one of the one or more computing devices, send a notification indicating removal of the at least one benign malware indicator from the at least one of the one or more computing devices.

In accordance with yet another aspect, one or more non-transitory computer-readable media are provided, the media storing computer-readable instructions that, when executed by at least one computer, cause the at least one computer to install at least one benign malware indicator on one or more computing devices, monitor the one or more computing devices for the at least one benign malware indicator, detect that the at least one benign malware indicator is no longer present on at least one of the one or more computing devices, and responsive to detecting that the at least one benign malware indicator is no longer present on the at least one of the one or more computing devices, send a notification indicating that the at least one benign malware indicator is no longer present on the at least one of the one or more computing devices, perform an antivirus scan on each of the at least one of the one or more computing devices, disable a network connection of each of the at least one of the one or more computing devices, or a combination thereof.

These summary descriptions are merely exemplary. In certain embodiments, the methods, apparatuses, and non-transitory computer-readable media comprise additional combinations or substitutions. Moreover, any of the features discussed in the exemplary embodiments of one aspect may be features of embodiments of any other aspect discussed herein.

BRIEF DESCRIPTION OF THE DRAWINGS

Exemplary embodiments of the disclosure will now be described by way of example only and with reference to the accompanying drawings, in which.

DETAILED DESCRIPTION OF EMBODIMENTS

The embodiments, apparatuses and methods described herein provide methods, apparatuses, and one or more non-transitory computer-readable media. In accordance to some aspects, the methods, apparatuses, and one or more non-transitory computer-readable media relate to techniques for detecting malware and/or monitoring a computing device. These and other aspects, features and advantages of certain embodiments will be further understood by those skilled in the art from the following description of exemplary embodiments. In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Various aspects described herein may be embodied as a method, a data processing system, and/or a computer program product. Accordingly, those aspects may take the form of an entirely hardware embodiment, an entirely software embodiment and/or an embodiment combining software and hardware aspects. Furthermore, such aspects may take the form of a computer program product stored by one or more non-transitory computer-readable storage media having computer-readable program code, or instructions, embodied in or on the storage media. The term "computer-readable medium" or "computer-readable storage medium" as used herein includes not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of tangible and/or non-transitory computer readable storage media such as hard disks, CD-ROMs, optical storage devices, magnetic storage devices, and/or any combination thereof.

Aspects of the method steps disclosed herein may be executed on one or more processors on a computing device 101. Such processors may execute computer-executable instructions stored on non-transitory computer-readable media. The disclosure may also be practiced in distributed computing environments where tasks are performed by remote processing devices that are linked through a communications network. In a distributed computing environment, program modules may be located in both local and remote computer storage media including memory storage devices.

Figure 1:
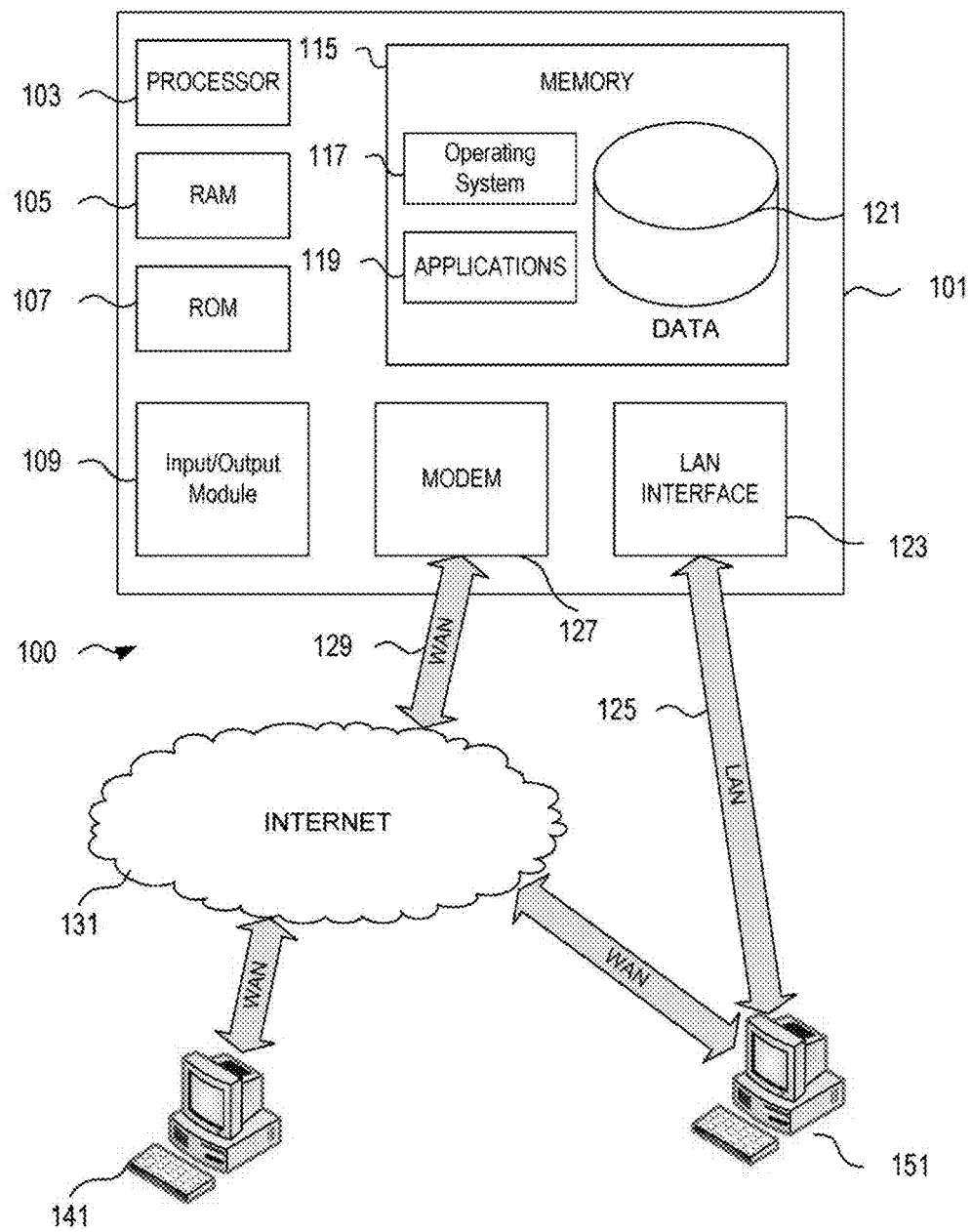
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computing device 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of computing device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

The computing device 101 may operate in a networked environment supporting connections to one or more remote computers, such as terminals 141 and 151. The terminals 141 and 151 may be personal computers or servers that include many or all of the elements described above relative to the computing device 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, smartphones, multiprocessor systems, microprocessor-based systems, set top boxes, programmable consumer electronics, network PCs, minicomputers, mainframe computers, distributed computing environments that include any of the above systems or devices, and the like.

Figure 2:
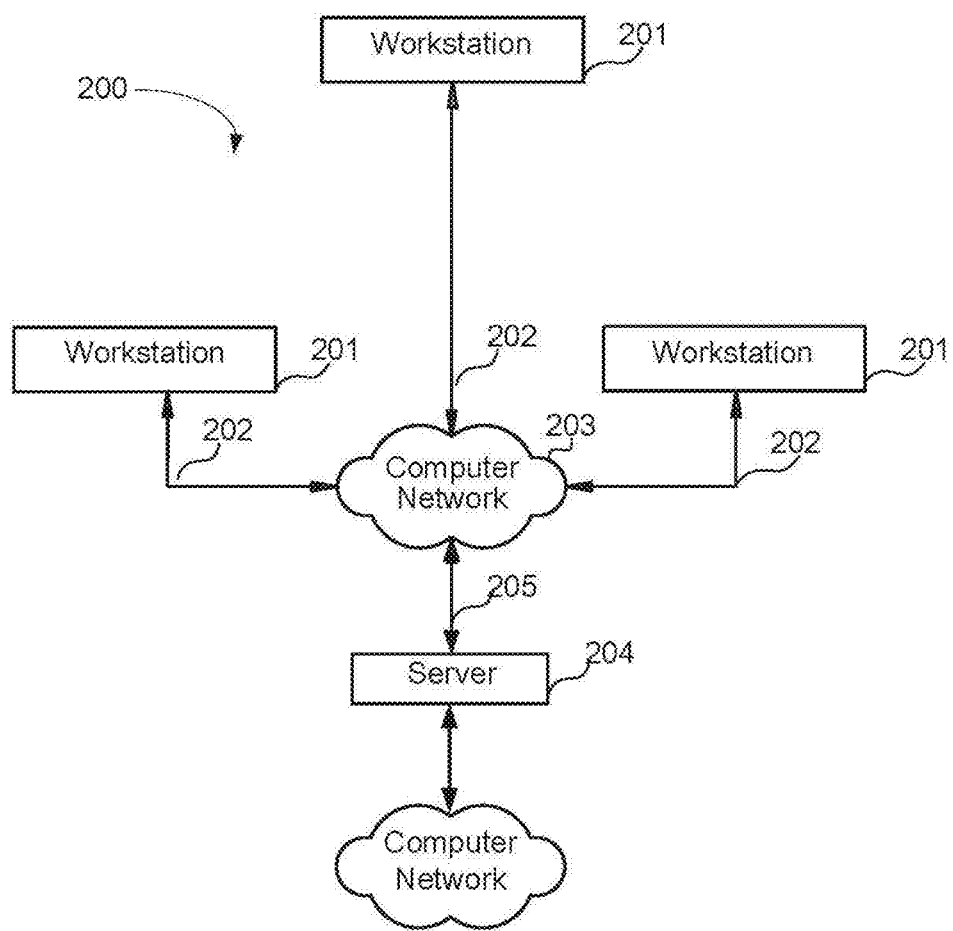
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The steps that follow in the Figures may be implemented by one or more of the components in FIGS. 1 and 2 and/or other components, including other computing devices.

Figure 3:
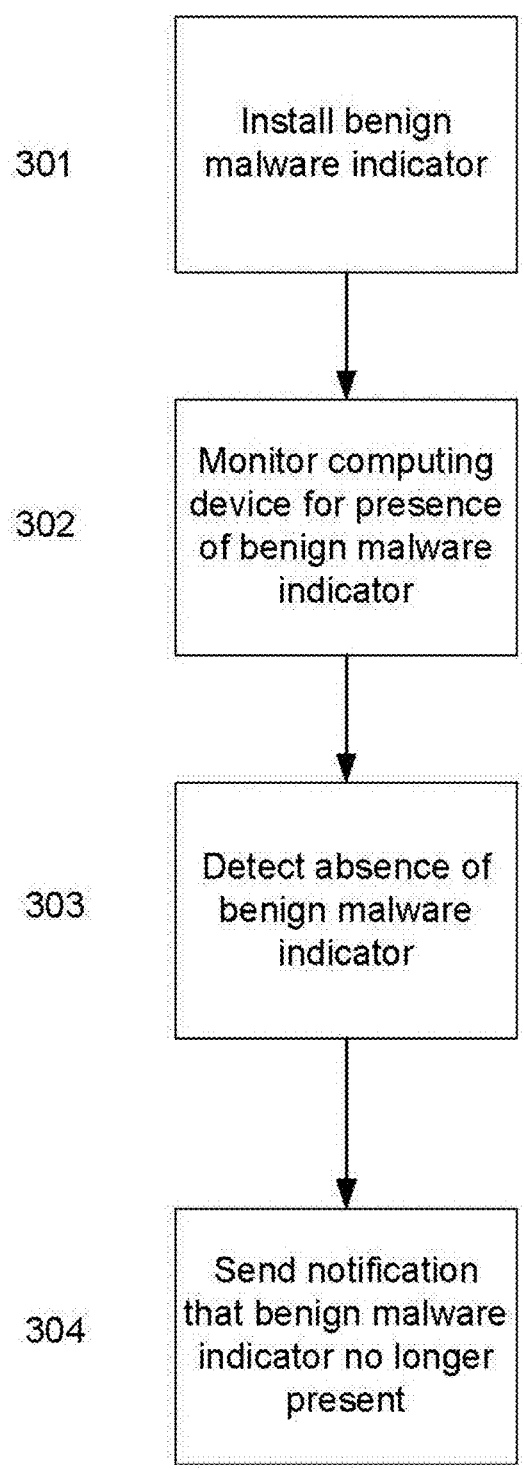
FIG. 3 is a flowchart of an exemplary method in accordance with one or more embodiments.

In accordance with one aspect, a method is provided for detecting the presence of malware and/or monitoring a computer device. FIG. 3 shows a flowchart of an exemplary embodiment of the method. In this exemplary embodiment, step 301 is installing a benign malware indicator on a computing device or on a group of computing devices. In some embodiments, any antivirus software or malware protection software programs installed on the one or more computing devices or that remotely monitor the one or more computing devices are configured to explicitly ignore the presence of the benign malware indicator since it is known to be a non-harmful entity. In step 302, the one or more computing devices are monitored for the continued presence of the benign malware indicator or for alterations to or attempts to access the indicator.

By virtue of its presence on the computing device, the indicator will show that it is likely that no new malware variants have infected the computing device. This is because as malware becomes more and more sophisticated, the installation of malware may actually result in the removal of malware that was previously installed on the computing device. In this manner, the newly installed malware does not have to "compete" with previously installed malware variants and can more easily achieve its own goals. Thus, if no new malware is installed on the same computing device, the benign malware indicator should remain present on the computing device. While older, less sophisticated malware may not target existing malware infections, these types of programs are much more likely to be rebuffed using existing protection techniques such as scanning for known malware signatures.

Once installed on a computing device, malware typically leaves multiple pieces of evidence of its presence although this evidence may be difficult to detect. Therefore, by installing a benign malware indicator that resembles a piece of evidence resulting from a genuine malware infection, embodiments of the method allow the controlled installation of a file or other indicator that will be targeted by new malware infections but will not cause any detrimental effects to the computing device in the meantime as a genuinely malicious malware program would.

In this manner, the presence or absence of the benign indicator alone can flag the likely presence of a new, genuinely malicious piece of malware that would be too sophisticated to easily and quickly detect by conventional methods. As the detection method may be tied to the monitoring a single file or other piece of evidence, these embodiments of the method advantageously allow the rapid detection of new malware variants that would avoid signature based comparisons without the consumption of system resources required by heuristic techniques. Even when the malware remains unidentified, the notification of its presence alone can allow beneficial actions such as the prevention of further infection of other devices on the network. Moreover, since few genuine software programs will delete unaffiliated files, these embodiments also mitigate the possibility of false positives associated with heuristic techniques.

In some embodiments of the method, the benign indicator is an inert, harmless or non-functional file or a modification to an existing file that copies, mimics or otherwise resembles an indicator or evidence of the presence of a genuinely malicious malware program. In exemplary embodiments where the benign indicator only resembles a single piece of evidence of genuine malware, the computing device's antivirus program can be configured to ignore that one particular piece of evidence but still scan for and remove the other types of evidence typically associated with malware. In this manner, these embodiments can still provide a wide scope of protection using traditional methods of malware detection and prevention if desired. In embodiments where multiple pieces of evidence are installed, the antivirus program may be programmed to ignore the presence of the multiple pieces but still scan for and remove other types of evidence.

The benign malware indicator may be any type of file, code, or modification to an existing file that would be targeted for modification, appropriation, or removal by a subsequent and genuine malware infection. In certain embodiments, the benign malware indicator may be a known malware signature, a hook, a kernel driver, a new or modified DLL file, a modified registry key, a modified system file, a connection and socket, an API function, packed code, or a combination thereof. As discussed in more detail below, in certain embodiments the malware indicator is an installed malware program rather than one or more pieces of evidence indicative of malware presence.

In this exemplary embodiment, step 303 is the detection of the absence of the benign malware indicator when it is removed or altered. The monitoring and detection steps can be accomplished through any standard techniques known in the art. In certain embodiments, the monitoring and detection are accomplished using a subject and observer pattern, one or more polling techniques, one or more push techniques, or a combination thereof.

Once the presence of the benign malware indicator is no longer detected there are a variety of possible response actions. In some embodiments, including the embodiment shown in FIG. 3, a notification that the benign malware indicator is no longer present on the one or more computing devices is sent in step 304. The content of the notification and its target can take many forms. For example, in some embodiments the notification is sent to the user of the computing device through the graphical user interface. In certain of these embodiments, the notification may alert the user that there is a recently acquired malware infection, urge the user to run their antivirus program, urge the user to update their antivirus program, urge the user to take a particular action such as disabling certain functionalities of their computing device, urge the user to contact an IT employee or professional, offer to perform one or more of the foregoing actions, automatically begin performing one or more of the foregoing actions and notifying the user of the performed actions, or a combination thereof.

The installation of the one or more indicators and the subsequent monitoring and notification can involve any number of computing devices. For example, a single computing device can be used to install the indicator on itself, monitor itself for the continued presence, and send a notification to an appropriate program on the computing device or to the user of the computing device. In other embodiments, a network server, such as command and control server, or a different computing device on the same network can be responsible for one or more of these steps, or be the target of the subsequent notification.

As additional representative examples, in various exemplary embodiments the notification may be sent to a server of the network, such as command and control server, or directly to an IT employee or professional. In some embodiments, the content of the notification identifies the particular computing device or devices where the benign malware indicator is no longer present. By prompting sending an alert in this manner, the network administrator, IT employee or professional or other relevant party is quickly alerted to the presence of a new malware infection that was sophisticated enough to avoid traditional inspection and filtering techniques. In certain embodiments, a server receives the notification and automatically takes a responsive action, including but not limited to quarantining the infected device or devices from the network. The rapid notification, amongst other benefits, allows the appropriate corrective action to be taken to preserve the security of the network and/or any associated computing devices and can help minimize the damage to the infected computing device.

Various embodiments of the method can comprise additional steps. For example, the method can optionally include, responsive to detecting removal of the at least one benign malware indicator from the at least one of the one or more computing devices, performing an antivirus scan on the one or more computing devices where the benign malware indicator is detected as absent. This scan may be performed immediately, before the notification is sent, after the notification is sent, or at the same time the notification is sent. In certain embodiments, a notification is not sent and the scan is the substantive response to the new malware infection, or comprises a portion of the response in conjunction with other actions. In various embodiments, the method may include updating the antivirus program used on the one or more computing devices, or the program used by the network administrator or server to monitor the one or more computing devices, after the benign malware indicator is no longer detected as present. In these embodiments, the antivirus scan may be subsequently performed using the updated program. As the malware infection is likely to be a relatively new malware variant, having the most recent signature information available will increase the odds that the subsequent virus scan is able to quickly identify the new malware infection.

In certain other embodiments, steps are included to help identify the source of the new malware infection. For example, downloads for a determined time period can be identified and logged to facilitate subsequent analysis of these files. This time period can be any appropriate time period ending at the time the benign malware indicator was no longer detected, including but not limited to the minute prior, the five minutes prior, the ten minutes prior, the thirty minutes prior, the hour prior, eight hours prior, a day prior, and so on, or the time period spanning from when the device was last booted to the time the benign malware indicator was no longer detected. In various embodiments, an IT employee or professional can enter the time period to be logged by the embodiment of the method. In other exemplary embodiments, any newly created files, recently executed files, recently opened files, and/or recently modified files can be identified and logged. The relevant time period for these steps can be any appropriate time period, including but not limited to those discussed above.

Figure 4:
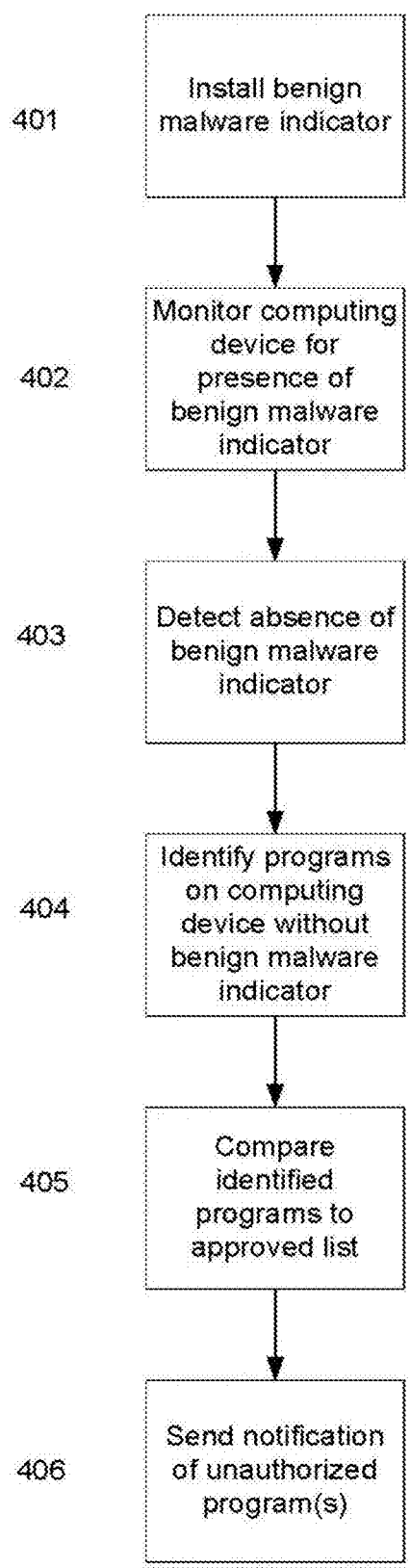
FIG. 4 is a flowchart of an exemplary method in accordance with one or more additional embodiments.

FIG. 4 shows a flowchart of another exemplary embodiment of the method, where the steps of this exemplary embodiment or a subset of its steps can be combined with any or all of the steps described above. Any of the additional features or components described above may also be used in this embodiment of the method and vice versa. In this exemplary embodiment, the step 401 includes installing a benign malware indicator on a computing device or on a group of computing devices. In step 402, the one or more computing devices are monitored for the continued presence of the benign malware indicator. If any subsequent event removes or alters the benign malware indicator, the absence of the benign malware indicator may be detected in step 403.

As discussed above, while a new, genuine malware infection may be responsible for removing the benign malware indicator, other types of software may also be responsible. While users on a secured network are often asked to utilize only previously approved software, users may still install additional programs on their own computing devices. These actions can compromise the security of their own computing device or network even if this was not the intended result of the user. The exemplary embodiment illustrated in FIG. 4 and other exemplary embodiments of the method, amongst other benefits and advantages, may provide notification of these types of unauthorized software installations.

FIG. 4 illustrates an exemplary embodiment of a method that provides such notification. In step 404, all software programs on the one or more computing devices or a plurality of software programs may be identified. In step 405, the identified programs are compared to a list of approved software programs, such as a list prepared by a network administrator or an IT employee or professional. If the comparison shows the presence of one or more unauthorized programs, a notification is sent. In some embodiments, the notification identifies the particular one or more computing devices as well as the particular identified programs. In others the notification may simply flag the one or more computing devices for further examination or inspection. The notification of unauthorized programs can be sent after a notification that the benign malware indicator is no longer present, can be substituted for a notification stating the indicator is no longer present, or can be part of the notification stating the benign indicator is no longer present. In certain embodiments multiple notifications can be sent, such as one for each unauthorized program, one for each computing device with at least one unauthorized program, or both (e.g., one notification per unauthorized program per device).

In certain exemplary embodiments, the identifying and comparing steps are limited to a subset of software programs. For example, in some embodiments only the most recently installed, downloaded and/or opened programs will be identified and compared to the approved list. In some embodiments, programs installed or downloaded since an IT employee issued the computing device, or installed since the last boot of the computer, or a combination of any of the above are compared to the approved list. In certain embodiments, a particular group of programs, such as those recently downloaded, are identified and compared first, with other groups then subsequently identified and compared if no unauthorized programs are found. In various embodiments, the groups are prioritized in the order of being the most likely to be responsible for the removal of the benign indicator, where in certain embodiments this order is determined by a network administrator or an IT employee or professional.

In certain other embodiments, the identified software programs consist of or comprise some or all of the antivirus programs installed on the one or more computing devices. In some of these embodiments, the list of approved software programs consists of or comprises approved antivirus programs. Since relatively few types of genuine and non-malicious software programs outside of antivirus programs will delete files unaffiliated with other programs, these embodiments are directed to evaluating the programs that may be the most likely cause of the removal of the benign malware indicator. In various embodiments, however, other groups of programs including but not limited to those described above may also be evaluated.

In some embodiments of the method, including those illustrated in FIGS. 3 and 4, the at least one benign malware indicator is an installed malware program rather than evidence indicative of malware, and the method further comprises configuring the antivirus program used to protect the one or more computing devices or configuring the other appropriate protection mechanisms to prevent any undesired effects resulting from or attributable to the presence of the installed malware. For security reasons, these embodiments should be limited to known types of malware where there is a high degree of confidence the current antivirus program or other measures can prevent any undesired effects. In certain embodiments, one or more of the functionalities of the malware may be allowed to function if it can provide a useful and controllable functionality. Provided these requirements can be met, any type of malware can be used as the benign indicator, or one or more pieces of evidence created by the controlled, installed malware can function as individual benign malware indicators, expanding the scope of protection by making it more likely a subsequent infection will target one or more of the benign indicators.

These descriptions of the method are merely exemplary. In certain embodiments, the method comprises additional combinations or substitutions of some or all of the steps, components and features described above. Moreover, additional and alternative suitable variations, features and steps for the method will be recognized by those skilled in the art given the benefit of this disclosure.

Other aspects of the disclosure relate to an apparatus. Any of the features discussed in the exemplary embodiments of the method may be features of embodiments of the apparatus and vice versa. Moreover, any of the steps of embodiments of the method may be performed by the apparatus, and any actions described below performed by the apparatus may be included in embodiments of the method. In certain embodiments, the apparatus comprises at least one processor, at least one non-transitory computer-readable medium, the medium having stored therein computer executable instructions, that when executed by the at least one processor, cause the apparatus to install at least one benign malware indicator on one or more computing devices, monitor the one or more computing devices for the presence of the at least one benign malware indicator, and responsive to detecting the removal of the indicator from at least one computing device, send a notification when the at least one benign malware indicator is no longer detected as present on the one or more computing devices.

In some exemplary embodiments, the computer executable instructions further cause the apparatus to, responsive to detecting removal of the at least one benign malware indicator from the at least one of the one or more computing devices, perform an antivirus scan on the one or more computing devices where the at least one benign malware indicator is no longer present. In certain of these embodiments, the computer executable instructions further cause the apparatus to, responsive to detecting removal of the at least one benign malware indicator from the at least one of the one or more computing devices, update an antivirus program before the apparatus performs the antivirus scan on the one or more computing devices, wherein the apparatus subsequently performs the antivirus scan using the updated antivirus program.

In various exemplary embodiments, the computer executable instructions further cause the apparatus to identify all software programs or a plurality of software programs installed on the one or more computing devices, compare the installed software programs to a list of approved software programs, and send a notification indicating the presence of an unauthorized software program for one or more of the installed software program that are not approved software programs. In some of these embodiments the computer executable instructions cause the apparatus to identify some or all of the antivirus programs installed on the one or more computing devices, compare the installed antivirus programs to a list of approved antivirus programs, and send a notification indicating the presence of an unauthorized antivirus program for one or more identified antivirus programs that are not approved antivirus programs.

In some exemplary embodiments, the least one benign malware indicator is an installed malware program, and the antivirus program used to protect the one or more computing devices is configured to prevent any undesired effects resulting from the presence of the installed malware. In certain embodiments, the apparatus monitors the one or more computing devices for the presence of the at least one benign malware indicator using a subject and observer pattern, polling techniques, push techniques, or a combination thereof. In various embodiments the at least one benign malware indicator is a known malware signature, a hook, a kernel driver, a new or modified DLL file, a modified registry key, a modified system file, a connection and socket, an API function, packed code, or a combination thereof.

These apparatus descriptions are merely exemplary. In certain embodiments, the apparatus comprises additional combinations or substitutions of some or all of the components described above. Additional and alternative suitable variations, forms and components for the apparatus will be recognized by those skilled in the art given the benefit of this disclosure.

Other aspects of the disclosure relate to one or more non-transitory computer-readable media storing computer-readable instructions. In certain embodiments, the one or more non-transitory computer-readable media store computer-readable instructions that, when executed by at least one computer, cause the at least one computer to install at least one benign malware indicator on one or more computing devices, monitor the one or more computing devices for the presence of the at least one benign malware indicator, detect the indicator is no longer present, and responsive to detecting the indicator is no longer present, send a notification, perform an antivirus scan on each of the one or more computing devices, disable the one or more computing devices' network connection, or a combination thereof.

In various embodiments, the instructions stored on the one or more non-transitory computer-readable media further cause the at least one computer to identify some or all of software programs installed on the one or more computing devices, compare the installed software programs to a list of approved software programs, and send a notification indicating the presence of an unauthorized software program for some or all of the installed software programs that are not approved software programs. In certain embodiments, the instructions cause the at least one computer to monitor the one or more computing devices for the presence of the at least one benign malware indicator using a subject and observer pattern, polling techniques, push techniques, or a combination thereof. In some embodiments, the at least one benign malware indicator is a known malware signature, a hook, a kernel driver, a new or modified DLL file, a modified registry key, a modified system file, a connection and socket, an API function, packed code, or a combination thereof.

These non-transitory media descriptions are merely exemplary. In certain embodiments, the non-transitory media comprise additional combinations or substitutions of some or all of the features or aspects described above. Additional and alternative suitable variations, forms and combinations will be recognized by those skilled in the art given the benefit of this disclosure.

What is claimed is:

1. A computer-implemented method comprising:
   installing, using a computer processor, on one or more computing devices, a single benign malware indicator file resembling a piece of evidence resulting from a genuine malware infection, wherein the benign malware indicator is an inert, harmless or non-functional file, or a modification to an existing file, and wherein the benign malware indicator is a copy of evidence resulting from a genuine malware infection, or an imitation of evidence resulting from a genuine malware infection;
   monitoring, using the computer processor, the one or more computing devices for the benign malware indicator;
   responsive to determining that the benign malware indicator is no longer detected as present on at least one of the one or more computing devices, sending a notification, using the computer processor, indicating that the benign malware indicator is no longer detected as present on the at least one of the one or more computing devices;
   responsive to detecting removal of the benign malware indicator from the at least one of the one or more computing devices, identifying, using the computer processor, a plurality of software programs installed on the one or more computing devices;
   comparing, using the computer processor, each of the plurality of software programs to a list of approved software programs to identify one or more unauthorized software programs installed on at least one of the one or more computing devices; and
   sending, using the computer processor, a notification indicating that the one or more unauthorized software programs are installed on the at least one of the one or more computing devices,
   wherein the plurality of software programs installed on the one or more computing devices comprises one or more antivirus programs installed on the one or more computing devices, wherein the list of approved software programs comprises one or more approved antivirus programs, and wherein the notification indicates an unauthorized antivirus program is present.

2. The computer-implemented method of claim 1, comprising: responsive to determining that the benign malware indicator is no longer detected as present on at least one of the one or more computing devices, performing, using the computer processor, an antivirus scan on the at least one of the one or more computing devices.

3. The computer-implemented method of claim 2, comprising: responsive to determining that the benign malware indicator is no longer detected as present on at least one of the one or more computing devices, updating, using the computer processor, an antivirus program on the at least one of the one or more computing devices, wherein the antivirus scan is performed on the at least one of the one or more computing devices subsequent to the antivirus program being updated.

4. The computer-implemented method of claim 1, wherein monitoring the one or more computing devices for the benign malware indicator comprises using at least one of a subject and observer pattern, one or more polling techniques, or one or more push techniques.

5. The computer-implemented method of claim 1, wherein the benign malware indicator comprises at least one of a known malware signature, a hook, a kernel driver, a new or modified dynamic link library (DLL) file, a modified registry key, a modified system file, a connection and socket, an application program interface (API) function, or packed code.

6. An apparatus comprising:

at least one processor; and at least one non-transitory computer-readable medium having stored therein computer executable instructions, that when executed by the at least one processor, cause the apparatus to:

install a single benign malware indicator on one or more computing devices, wherein the benign malware indicator resembles a piece of evidence resulting from a genuine malware infection, wherein the benign malware indicator is an inert, harmless or non-functional file, or a modification to an existing file, and wherein the benign malware indicator is a copy of evidence resulting from a genuine malware infection, or an imitation of evidence resulting from a genuine malware infection;

detect removal of the benign malware indicator from at least one of the one or more computing devices; and responsive to detecting removal of the benign malware indicator from the at least one of the one or more computing devices, send a notification indicating removal of the benign malware indicator from the at least one of the one or more computing devices;

responsive to detecting removal of the benign malware indicator from the at least one of the one or more computing devices, identify a plurality of software programs installed on the one or more computing devices;

compare each of the plurality of software programs to a list of approved software programs to identify one or more unauthorized software programs installed on at least one of the one or more computing devices; and send a notification indicating that the one or more unauthorized software programs are installed on the at least one of the one or more computing devices, wherein the plurality of software programs installed on the one or more computing devices comprises one or more antivirus programs installed on the one or more computing devices, wherein the list of approved software programs comprises one or more approved antivirus programs, and wherein the notification indicates an unauthorized antivirus program is present.

7. The apparatus of claim 6, wherein the computer executable instructions further cause the apparatus to, responsive to detecting removal of the benign malware indicator from the at least one of the one or more computing devices, perform an antivirus scan on the at least one of the one or more computing devices.

8. The apparatus of claim 7, wherein the computer executable instructions further cause the apparatus to, responsive to detecting removal of the benign malware indicator from the at least one of the one or more computing devices, update an antivirus program before the apparatus performs the antivirus scan on the at least one of the one or more computing devices.

9. The apparatus of claim 6, wherein the apparatus is configured to detect removal of the benign malware indicator from the at least one of the one or more computing devices using at least one of a subject and observer pattern, one or more polling techniques, or one or more push techniques.

10. The apparatus of claim 6, wherein the benign malware indicator comprises at least one of a known malware signature, a hook, a kernel driver, a new or modified dynamic link library (DLL) file, a modified registry key, a modified system file, a connection and socket, an application program interface (API) function, or packed code.

11. One or more non-transitory computer-readable media storing computer-readable instructions that, when executed by at least one computer, cause the at least one computer to:

install a single benign malware indicator on one or more computing devices, wherein the benign malware indicator resembles a piece of evidence resulting from a genuine malware infection, wherein the benign malware indicator is an inert, harmless or non-functional file, or a modification to an existing file, and wherein the benign malware indicator is a copy of evidence resulting from a genuine malware infection, or an imitation of evidence resulting from a genuine malware infection;

monitor the one or more computing devices for the benign malware indicator;

detect that the benign malware indicator is no longer present on at least one of the one or more computing devices; and responsive to detecting that the benign malware indicator is no longer present on the at least one of the one or more computing devices:

send a notification indicating that the benign malware indicator is no longer present on the at least one of the one or more computing devices;

perform an antivirus scan on each of the at least one of the one or more computing devices;

disable a network connection of each of the least one of the one or more computing devices;

or a combination thereof; and responsive to detecting removal of the benign malware indicator from the at least one of the one or more computing devices, identify a plurality of software programs installed on the one or more computing devices;

compare each of the plurality of software programs to a list of approved software programs to identify one or more unauthorized software programs installed on at least one of the one or more computing devices; and send a notification indicating that the one or more unauthorized software programs are installed on the at least one of the one or more computing devices, wherein the computer-readable instructions cause the at least one computer to detect that the benign malware indicator is no longer present on at least one of the one or more computing devices by utilizing at least one of a subject and observer pattern, one or more polling techniques, or one or more push techniques.

12. The one or more non-transitory computer-readable media of claim 11, wherein the benign malware indicator comprises at least one of a known malware signature, a hook, a kernel driver, a new or modified dynamic link library (DLL) file, a modified registry key, a modified system file, a connection and socket, an application program interface (API) function, or packed code.

* * * * *